(12) United States Patent
Kim et al.

(10) Patent No.: US 8,504,092 B2
(45) Date of Patent: Aug. 6, 2013

(54) METHOD OF CONTROLLING UPLINK POWER BASED ON CELL INTERFERENCE IN AN ORTHOGONAL FREQUENCY MULTIPLEX DIVISION ACCESS SYSTEM

(75) Inventors: Ji Hyung Kim, Daejeon (KR); Byung-Jae Kwak, Daejeon (KR); Dong Seung Kwon, Daejeon (KR); Se-Jin Kim, Gimhae-si (KR); Min-Seok Jang, Suwon-si (KR); Een-Kee Hong, Seongnam-si (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 12/747,675

(22) PCT Filed: Oct. 24, 2008

(86) PCT No.: PCT/KR2008/006308
§ 371 (c)(1),
(2), (4) Date: Jun. 11, 2010

(87) PCT Pub. No.: WO2009/078576
PCT Pub. Date: Jun. 25, 2009

(65) Prior Publication Data
US 2010/0291962 A1    Nov. 18, 2010

(30) Foreign Application Priority Data

Dec. 17, 2007   (KR) .................. 10-2007-0132628

(51) Int. Cl.
*H04W 52/04* (2009.01)
*H04W 52/24* (2009.01)

(52) U.S. Cl.
USPC ............................. 455/522; 455/69

(58) Field of Classification Search
None
See application file for complete search history.

(56) References Cited

U.S. PATENT DOCUMENTS

| 7,609,661 | B2 | 10/2009 | Chae et al. | |
| 2004/0203981 | A1* | 10/2004 | Budka et al. | 455/522 |
| 2005/0143118 | A1* | 6/2005 | Bernhardsson et al. | 455/522 |
| 2006/0209767 | A1 | 9/2006 | Chae et al. | |
| 2007/0082620 | A1 | 4/2007 | Zhang et al. | |
| 2007/0189047 | A1 | 8/2007 | Lee et al. | |
| 2008/0057934 | A1 | 3/2008 | Sung et al. | |

FOREIGN PATENT DOCUMENTS

| KR | 10-2006-0091938 A | 8/2006 |
| KR | 10-2007-0076463 A | 7/2007 |
| KR | 10-0765892 B1 | 10/2007 |

OTHER PUBLICATIONS

Jim Tomcik et al., MBFDD and MBTDD: Proposed Draft Air Interface Specification, IEEE C802.20, Jan. 6, 2006.

\* cited by examiner

*Primary Examiner* — Philip Sobutka
(74) *Attorney, Agent, or Firm* — Jefferson IP Law, LLP

(57) ABSTRACT

Provided is that a base station that receives an index and a path attenuation difference of a monitoring sector from a mobile station and receives an amount of interference of the monitoring sector from a base station that corresponds to the monitoring sector. In addition, the base station measures an interference state of the monitoring sector by using the amount of interference and the path attenuation difference and calculates a control value of uplink power based on the interference state of the monitoring sector. Further, the base station transmits the control value of the uplink power to the mobile station.

10 Claims, 3 Drawing Sheets

US 8,504,092 B2

METHOD OF CONTROLLING UPLINK POWER BASED ON CELL INTERFERENCE IN AN ORTHOGONAL FREQUENCY MULTIPLEX DIVISION ACCESS SYSTEM

TECHNICAL FIELD

The present invention relates to an uplink power control method. Particularly, the present invention relates to a method for controlling uplink power while considering cell interference in an orthogonal frequency multiplex division access system.

BACKGROUND ART

An OFDMA (Orthogonal Frequency Division Multiplex Access: OFDMA, or OFDM-FDMA) communication system uses one of multiple access methods. In the OFDMA communication system, a base station constructs a cell and allocates at least one subcarrier to at least one mobile station that is included in the cell. Here, the sub-carriers allocated to the mobile stations are different from each other. According to the OFDMA communication system, it is possible to minimize intra-cell interference.

Meanwhile, a plurality of cells use a plurality of subcarriers in a general OFDMA communication system. At least one of the plurality of subcarriers used in a cell has the same index as that of other cells, and thereby interference (which will be called "Other Cell Interference: OCI) is generated by power of a neighboring mobile station positioned in a neighboring cell. Particularly, when a mobile station positioned at a boundary of a cell transmits signal having high transmission power with an allocated subcarrier to a base station, other cells except for the cell including the mobile station undergo interference influence. Therefore, an uplink control method for further controlling transmission power according to interference states of other cells is needed.

According to a general uplink control method of an OFDMA communication system, as shown in IEEE 802.20, a mobile station determines a plurality of monitoring sectors based on an amount of interference that has an effect on other cells. In addition, the mobile station may not use all of the plurality of monitoring sectors when controlling transmission power, and thus selects a monitoring sector to be used for the transmission power control from among the plurality of monitoring sectors through probability calculation. Here, there are few occasions in which the mobile station applies an interference amount of a monitoring sector to the transmission power control by the probability calculation using parameters of very small values. Therefore, according to the general uplink control method, even though interference has a great deal of effect on other sectors, it is unable to actively apply interference states of other cells to the uplink power control.

Further, according to the general method, a mobile station increases or reduces transmission power by a fixed threshold value based on an interference state of a monitoring sector to be applied to the uplink transmission power control, and the interference state is therefore not applied subsequently to the uplink transmission power control.

As described above, the general uplink power method includes a very complex calculation process, and thereby operation load of the mobile station increases.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an uplink power control method for reducing a calculation amount of a mobile station for uplink power control and controlling uplink power by applying interference states of other cells as much as possible to the uplink power control.

Technical Solution

An exemplary embodiment of the present invention provides a method for a base station to control uplink power of a mobile station. The method includes: receiving an index and a path attenuation difference that correspond to a monitoring sector of the mobile station from the mobile station; receiving an amount of interference of the monitoring sector from a base station of the monitoring sector; evaluating a control value of the uplink power based on the amount of interference and the path attenuation difference; and transmitting the control value of the uplink power to the mobile station.

The evaluating of the control value evaluates the control value based on the path attenuation difference and a difference between the amount of interference and an amount of reference interference. Here, the evaluating of the control value includes comparing the amount of interference with the amount of reference interference, and calculating an interference state by dividing the difference between the amount of interference and the amount of reference interference by the path attenuation difference when the amount of interference is more than the amount of reference interference.

Also, the evaluating of the control value includes searching an interference state range including the interference state from among a plurality of interference state reference ranges, and determining an amount of power reduction that corresponds to a selected interference state reference range and evaluating the control value of the uplink power based on the amount of power reduction. In addition, the calculating of the interference state further includes calculating the interference state by multiplying the difference between the amount of interference and the amount of reference interference by the path attenuation difference when the amount of interference is less than the amount of reference interference. Here, the evaluating of the control value includes searching an interference state reference range including the interference state among a plurality of interference state reference ranges, and determining an amount of power increment that corresponds to the selected interference state reference range and evaluating the control value of the uplink power based on the amount of power increment.

In the method, the monitoring sector may be a neighboring sector that has a minimum path attenuation difference among a plurality of neighboring sectors that correspond to the mobile station.

Another exemplary embodiment of the present invention provides a method for a mobile station to control uplink power based on interference states of neighboring sectors. The method includes: transmitting an index and the path attenuation difference of the monitoring sector to a base station in which the mobile station is included wherein the monitoring sector has a minimum path attenuation difference among the neighboring sectors; and receiving a control value of the uplink power from the base station, wherein the control value of the uplink power is obtained based on the path attenuation difference of the monitoring sector.

The method further includes receiving a plurality of pilot signals from base stations of the plurality of neighboring sectors, respectively, and receiving a pilot signal from the base station in which the mobile station is included.

In addition, the obtaining of the plurality of path attenuation differences includes measuring a plurality of average reception powers and a plurality of average transmission powers by using the plurality of pilot signals, and calculating the plurality of path attenuation differences by using the plurality of average reception powers and the plurality of average transmission powers.

Advantageous Effects

According to the exemplary embodiments of the present invention, a monitoring sector that is under a great deal of effect by uplink power of a mobile station from among the plurality of neighboring sectors is preferentially applied to uplink power control, and a state of the monitoring sector is applied to a control value of the uplink power. Therefore, it is possible to improve performance of the uplink power control. In addition, the state of one monitoring sector is applied to the uplink power control, and thereby an operation amount for the uplink power control is reduced. Further, a base station generates the control value of uplink power, and thereby operation load of the mobile station may be reduced.

MODE FOR THE INVENTION

Figure 1:
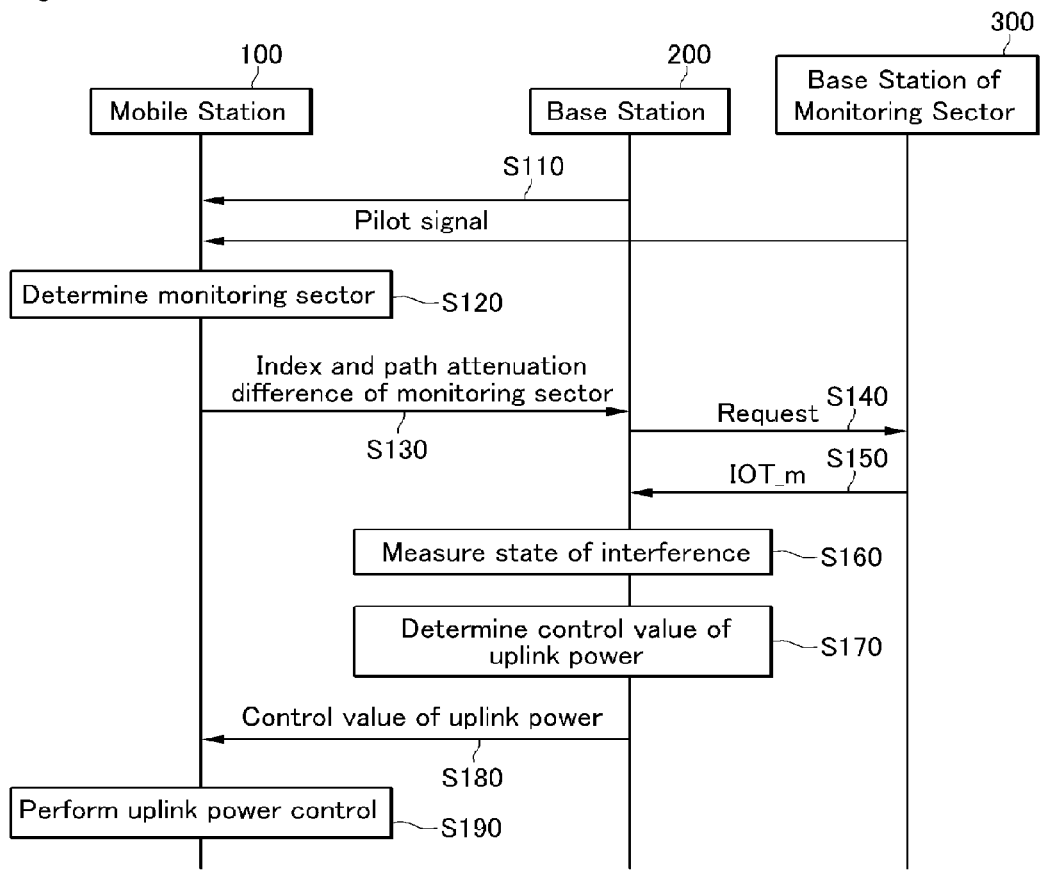
FIG. 1 shows a flowchart of an uplink power control method according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Now, an exemplary embodiment of the present invention will be described in detail with reference to the accompanying drawings.

Hereinafter, it is assumed that noise and interference (NI) of a cell is not generated by a mobile station that is included in the same cell, but by a mobile station that is included in other cells and uses the same subcarrier. In addition, interference over thermal noise (hereinafter called "IOT") represents the magnitude of NI, which is generated in a subcarrier bandwidth, over the thermal noise.

FIG. 1 shows a flowchart of a method for controlling uplink power with the same uplink subcarrier according to an exemplary embodiment of the present invention.

As shown in FIG. 1, a mobile station 100 receives a base station pilot signal from a base station 200 in which the mobile station is included, and receives a plurality of pilot signals from a plurality of base stations that are included in a plurality of neighboring sectors (S110).

The mobile station 100 determines one of the plurality of neighboring sectors as a monitoring sector 300 by using the base station pilot signal and the plurality of pilot signals (S120).

Figure 2:
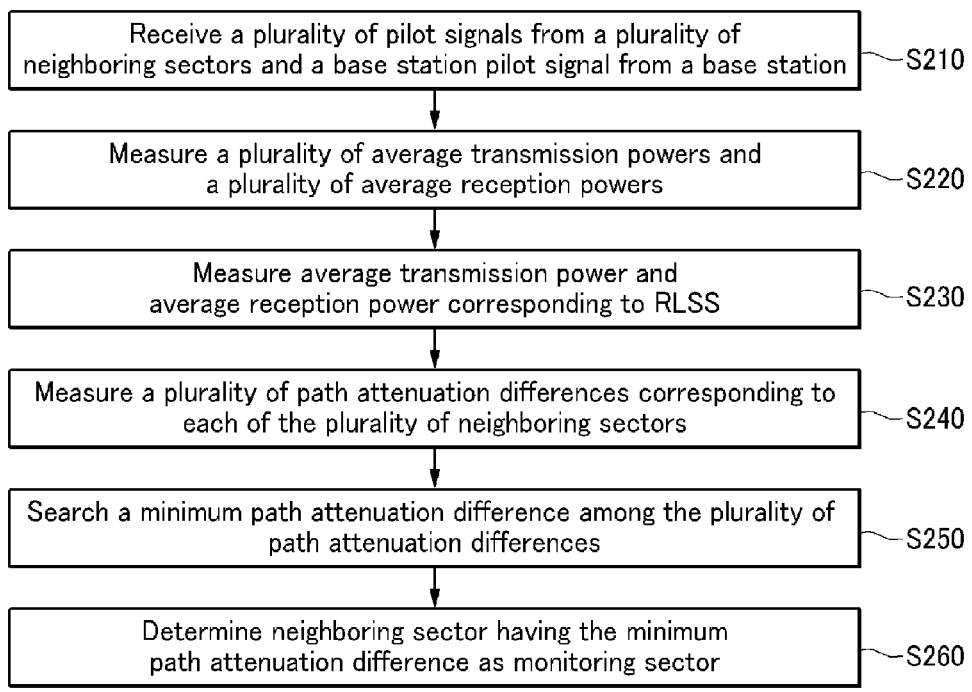
FIG. 2 shows a flowchart of a method that determines a monitoring sector according to the exemplary embodiment of the present invention.

FIG. 2 shows a flowchart of a method for determining the monitoring sector according to the exemplary embodiment of the present invention.

As shown in FIG. 2, the mobile station 100 receives the base station pilot signal from the base station 200 in which the mobile station is included, and receives the plurality of pilot signals from the plurality of base stations that are included in the plurality of neighboring sectors (Sector_i) (S210).

The mobile station 100 respectively measures a plurality of average transmission powers (TransmitPower_i) and a plurality of average reception powers (RxPower_i) corresponding to each base station of the plurality of the neighboring sectors (Sector_i) by using the plurality of pilot signals (S220).

The mobile station 100 measures average transmission power (TransmitPower_RLSS) and average reception power (RxPower_RLSS) corresponding to an F-ACQCH (forward acquisition channel) of an RLSS (reverse link serving sector) by using the base station pilot signal (S230).

In addition, the mobile station 100 measures a plurality of path attenuation differences corresponding to each of the plurality of neighboring sectors by using the average transmission power (TransmitPower_RLSS) and average reception power (RxPower_RLSS) of the RLSS, and the plurality of average transmission powers (TransmitPower_i) and the plurality of average reception powers (RxPower_i) corresponding to each of the base stations of the plurality of neighboring sectors (Sector_i) (S240). Here, a path attenuation difference represents a difference between path attenuation that is generated between the mobile station 100 and the base station 200 and path attenuation that is generated between the mobile station 100 and a base station of a neighboring sector.

Equation 1 is for calculating the path attenuation difference.

$$ChanDiff_i = \frac{RxPower_{RLSS}}{TransmitPower_{RLSS}} \times \frac{TransmitPower_i}{RxPower_i} \quad \text{(Equation 1)}$$

According to Equation 1, the mobile station 100 calculates the plurality of path attenuation differences (ChanDiff_i) corresponding to each of the plurality of neighboring sectors (Sector_i).

The mobile station 100 searches a minimum path attenuation difference (ChanDiff_m) among the plurality of path attenuation differences (ChanDiff_i) (S250). Then, the mobile station 100 determines a neighboring sector having the minimum path attenuation difference (ChanDiff_m) as a monitoring sector (Sector_m) (S260).

As described above, according to the exemplary embodiment of the present invention, the mobile station 100 selects a neighboring sector to be expected to have a great deal of effect from among the plurality of neighboring sectors and applies it to uplink power control. Therefore, the mobile station 100 may always apply the monitoring sector to the uplink power control without a further process based on probability.

Next, a further description for FIG. 1 will be given.

As shown in FIG. 1, the mobile station 100 transmits an index and the path attenuation difference (ChanDiff_m) of the monitoring sector (Sector_m) selected from the plurality of neighboring sectors (Sector_i) to the base station 200 (S130).

The base station 200 receives the index and the path attenuation difference (ChanDiff_m) of the monitoring sector (Sector_m) from the mobile station 100. Then, the base station 200 requests a mobile station 300 that corresponds to the monitoring sector (Sector_m) to transmit an IOT of the monitoring sector (Sector_m) generated by uplink transmission power of the mobile station 100 (S140). Hereinafter, the IOT of the monitoring sector (Sector_m) is called IOT_m.

The base station 200 receives the IOT_m from the mobile station 300 of the monitoring sector (Sector_m) (S150).

The base station 200 measures an interference state (NI_State) of the monitoring sector (Sector_m) by using the IOT_m (S160) and determines a control value of uplink power by using the interference state (NI_State) (S170). A method for the base station 200 to evaluate the control value of uplink power will be described.

The base station 200 transmits the control value of uplink power to the mobile station 100 (S180).

The mobile station 100 receives the control value of uplink power from the base station 200 and performs uplink power control based on the control value of uplink power (S190).

Next, the method for the base station 200 to evaluate the control value of uplink power will be described.

Figure 3:
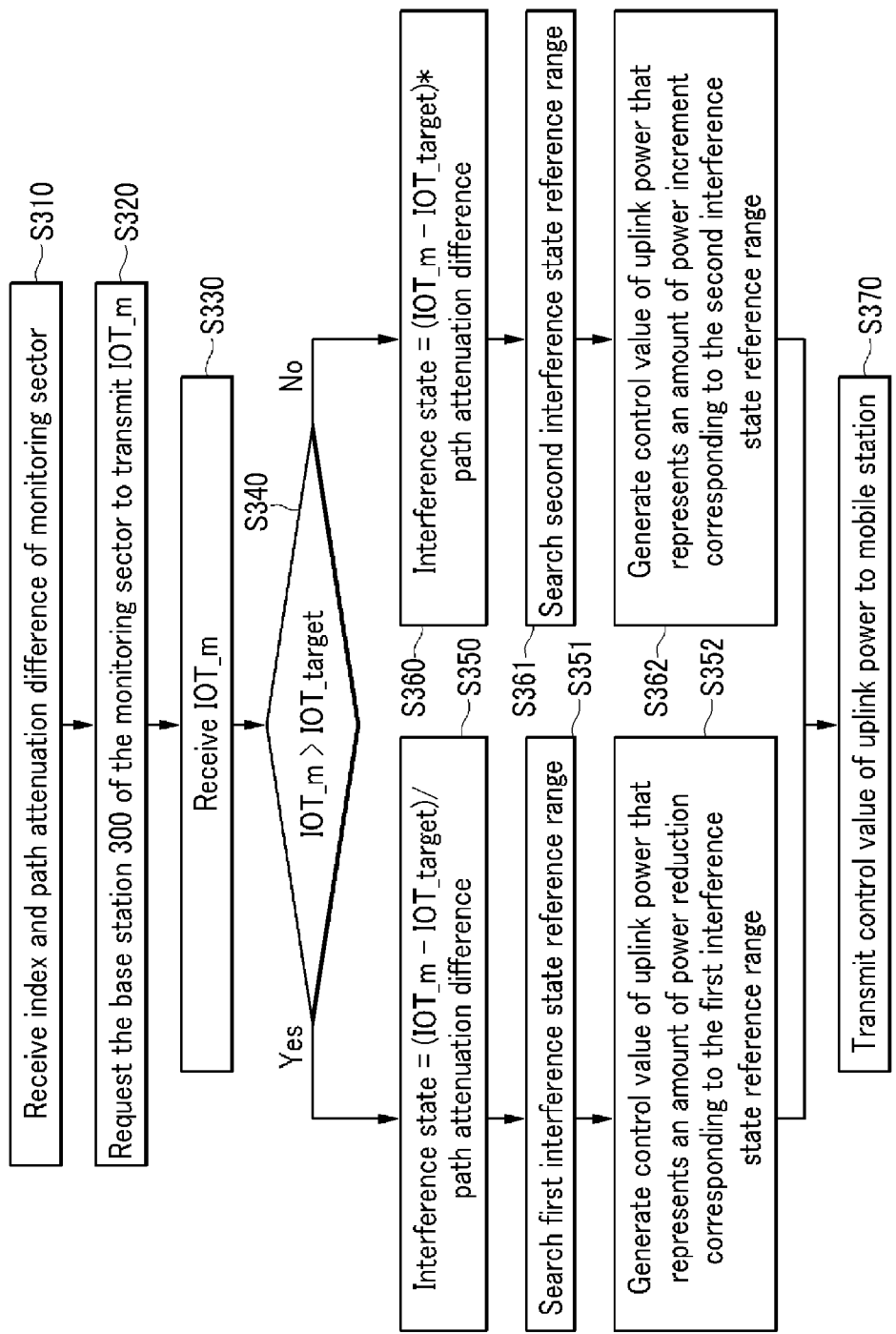
FIG. 3 shows a flowchart of a method that evaluates a control value of uplink power according to the exemplary embodiment of the present invention.

FIG. 3 shows a flowchart of the method for evaluating the control value of uplink power according to the exemplary embodiment of the present invention.

As described in FIG. 2, the base station 200 receives the index and the path attenuation difference (ChanDiff_m) of the monitoring sector (Sector_m) from the mobile station 100 (S310).

The base station 200 requests the base station 300 of the monitoring sector (Sector_m) to transmit the IOT_m (S320) and receives the IOT_m from the base station 300 of the monitoring sector (Sector_m) (S330).

The base station 200 compares the IOT_m with an IOT reference value (hereinafter called "IOT_target") (S340).

When the IOT_m is greater than the IOT_target, the base station 200 measures the interference state (NI_State) as in the following Equation 2 (S530).

$$NI\_State = (IOT\_m - IOT\_target)/ChanDiff\_m \quad \text{(Equation 2)}$$

As shown in Equation 2, the base station 200 calculates the interference state (NI_State) by dividing a difference between the IOT_m and the IOT_target by the path attenuation difference (ChanDiff_m). In this instance, the IOT_m is larger than the IOT_target, and the interference state (NI_State) is therefore a positive integer.

As shown in Equation 2, the larger the difference between the IOT_m and the IOT_target is, the larger the positive interference state (NI_State) is. That is, the positive interference state (NI_State) increases in proportion to the IOT_m of the monitoring sector. In addition, the smaller the path attenuation difference (ChanDiff_m) is, the larger the positive interference state (NI_State) is. That is, the closer the mobile station 100 is positioned to the monitoring sector (Sector_m), the larger the positive interference state (NI_State) is.

The base station 200 determines an amount of reduction power in proportion to the positive interference state (NI_State). That is, the larger the positive interference state (NI_State) is, the larger the determined amount of the power reduction is.

That is, the base station 200 searches a first interference state reference range including the positive interference state (NI_State) obtained by Equation 2 among a plurality of interference state reference ranges that have a positive integer (S351). The interference state reference range is hereinafter called "a positive range". Here, the plurality of positive ranges are denoted as 0<power control threshold value_1≦the first positive range<power control threshold value_2≦the second positive range<power control threshold value_3< ... ≦power control threshold value_k≦the k positive range<power control threshold value_k+1< ....

Further, the plurality of positive ranges respectively correspond to a plurality of power reduction amounts. That is, the k-th positive range corresponds to the k-th power reduction amount. Here, the plurality of power reduction amounts are denoted as the first power reduction amount<the second power reduction amount< ... <the k-th power reduction amount<the k+1-th power reduction amount< ....

The base station 200 determines an amount of power reduction corresponding to the first interference state reference range among the plurality of power reduction amounts, and generates a control value of uplink power that represents the determined power reduction amount (S352).

Meanwhile, when the IOT_m is not more than the IOT_target, the base station 200 measures interference state (NI_State) as in the following Equation 3 (S360).

$$NI\_State = (IOT\_m - IOT\_target) * ChanDiff\_m \quad \text{(Equation 3)}$$

As shown in Equation 3, the base station 200 calculates the interference state (NI_State) by multiplying the difference between the IOT_m and the IOT_target by the path attenuation difference (ChanDiff_m). In this instance, when the IOT_m is smaller than the IOT_target, the interference state (NI_State) is a negative integer.

As shown in Equation 3, the larger the difference between the IOT_m and the IOT_target is, the smaller the negative interference state (NI_State) is.

That is, the larger the IOT_m of the monitoring sector is, the smaller the calculated negative interference state (NI_State) is. In addition, the larger the path attenuation difference (ChanDiff_m) is, the smaller the negative interference state (NI_State) is. That is, the further the mobile station 100 is from the monitoring sector (Sector_m), the smaller the calculated negative interference state (NI_State) is. More specifically, the smaller the IOT_m of the monitoring sector is, or the larger the path attenuation difference (ChanDiff_m) is, the larger the absolute value of the negative interference state (NI_State) is.

The base station 200 determines a power increment amount in inverse proportion to the negative interference state (NI_State).

That is, the smaller the negative interference state (NI_State) is (that is, the larger the absolute value of the negative interference state (NI_State) is), the larger the determined power increment amount is.

Specifically, the base station 200 searches a second interference state reference range including the negative interference state (NI_State) obtained by Equation 3 among the plurality of negative interference state reference ranges (hereinafter called "a negative range") (S361). Here, the plurality of negative ranges are denoted as . . . <a power control threshold value_k+1=<a k-th negative range<a power control threshold value_k=<a k−1-th negative range< . . . <a power control threshold value_2=<the first negative range<a power control threshold value_1<0.

In addition, the plurality of negative ranges respectively correspond to a plurality of power increment amounts. That is, the k-th negative range corresponds to the k-th power increment amount. Here, the plurality of power increment amounts are denoted as the first power increment amount<the second power increment amount< . . . <the k-th power increment amount<the k+1-th power increment amount< . . . .

The base station 200 determines an amount of power increment corresponding to the second interference state reference range among the plurality of power increment amounts, and generates a control value of uplink power that represents the determined power increment amount (S362).

Meanwhile, when one of the plurality of positive ranges does not include the positive interference state (NI_State) or when one of the plurality of negative ranges does not include the negative interference state (NI_State), the base station 200 generates the control value not by using the interference state of the monitoring sector, but only by using an open loop or a closed loop power control method.

Comparison of performance of the uplink power control method according to the exemplary embodiment of the present invention and performance of a general uplink power control method (hereinafter called "a traditional method") will now be described in detail.

Table 1 represents conditions for system level simulation to compare the performance of the traditional method with the performance of the exemplary embodiment of the present invention.

TABLE 1

| PARAMETER | VALUE |
|---|---|
| Number of cells | 3 sector 19 cell (2-tier) wrap-around model |
| Density of power noise | −173 dBm/Hz |
| Path-loss Model (BTSAnt Ht = 15 m) | $L_{pl}$ (D) = 40 × (1 − 4 × 10$^3$Δh$_b$) × log$_{10}$ (D) − 18 × log$_{10}$ (Δh$_b$) + 21 × log$_{10}$ (f) + 80 |
| Traffic Model | Gaming Model:ACK Model = 6:4 |
| BTS MAX power | 43 dBm |
| MS MAX power | 23 dBm |
| Used frequency | 2.3 GHz |
| Bandwidth of channel | 10 MHz |
| FFT size | 1024 |
| Used subcarrier | 860 |
| Frame length | 5 ms (Downlink:Uplink = 2:1) |

TABLE 1-continued

| PARAMETER | VALUE |
|---|---|
| Subchannel allocation method | PUSC |

By performing the simulation based on the conditions described in Table 1, results of Tables 2 to 4 are obtained.

Table 2 represents the performance of the traditional method according to the IOT_target, and further represents the comparison results for the performance of the traditional method in the case of including a process that determines a plurality of monitoring sectors to be applied to the power control through probability calculation and the performance of the traditional method in the case of not including the process.

TABLE 2

|  | IOT 6 dB | IOT 6 dB (probability elimination) | IOT 12 dB | IOT 12 dB (probability elimination) |
|---|---|---|---|---|
| Throughput [Mbps] | 1.96 | 2.09 | 1.96 | 1.97 |
| Avg. power [dBm] | 19.18 | 15.49 | 19.19 | 17.63 |
| NI [dBm] | −118.4 | −123.3 | −118.4 | −120.8 |

As shown in Table 2, it is confirmed that there is little difference between the power control performance of the traditional method in a case in which the IOT_target is 6 dB and the power control performance of the traditional method in a case in which the IOT_target is 12 dB. Also, when the IOT_target is 6 dB, there is little difference between the power control performance of the traditional method in the case of including the process that determines a plurality of monitoring sectors to be applied to the power control through probability calculation and the power control performance of the traditional method in the case of not including the process. Further, when the IOT_target is 12 dB, there is also little difference between the power control performance of the traditional method in the case of including the process and the power control performance of the traditional method in the case of not including the process.

As shown in Table 2, according to the traditional method, it may be confirmed that the power control performance of the traditional method does not improve even though the IOT_target or the plurality of the monitoring sectors determined through the probability calculation are applied to the power control.

Table 3 represents comparison results for performance of the traditional method in cases of respectively applying 1 to 4 monitoring sectors to the power control.

TABLE 3

| Monitoring sector size | 1 | 2 (default) | 3 | 4 |
|---|---|---|---|---|
| Throughput [Mbps] | 1.959 | 1.964 | 1.960 | 1.966 |
| Avg. power [dBm] | 19.297 | 19.180 | 19.134 | 19.138 |
| NI [dBm] | −118.31 | −118.43 | −118.46 | −118.44 |

As shown in Table 3, even though a number of the monitoring sectors are applied to the power control, it is confirmed that the performance of the power control does not improve. Therefore, it is possible to expect that the performance of the power control may not further deteriorate even though the interference state of a monitoring sector is applied to the power control.

Table 4 represents comparison results of the performance of the exemplary embodiment of the present invention and the performance of the traditional method.

TABLE 4

|  | IOT 6/18 | IOT 6/9 | Exemplary embodiment |
| --- | --- | --- | --- |
| Throughput [Mbps] | 1.964 | 2.089 | 2.092 |
| Avg. power [dBm] | 19.18 | 16.33 | 15.16 |
| NI [dBm] | −118.43 | −122.62 | −123.94 |

Table 4 represents comparison results of the performance of the traditional method when a threshold value (6/18 and 6/9) for determining serious interference state varies and further represents the performance of the power control of the exemplary embodiment of the present invention.

As shown in Table 4, according to the exemplary embodiment of the present invention, it can be confirmed that the performance of the power control improves in comparison with the performance of the traditional method.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station to control uplink power of a mobile station, the method comprising:
   receiving an index and a path attenuation difference that correspond to a monitoring sector of the mobile station from the mobile station;
   receiving an amount of interference of the monitoring sector from a base station of the monitoring sector;
   evaluating a control value of the uplink power based on the amount of interference and the path attenuation difference; and
   transmitting the control value of the uplink power to the mobile station.

2. The method of claim 1, wherein the evaluating of the control value evaluates the control value based on the path attenuation difference and a difference between the amount of interference and an amount of reference interference.

3. The method of claim 2, wherein the evaluating of the control value comprises:
   comparing the amount of interference with the amount of reference interference; and
   calculating an interference state by dividing the difference between the amount of interference and the amount of reference interference by the path attenuation difference when the amount of interference is more than the amount of reference interference.

4. The method of claim 3, wherein the evaluating of the control value comprises:
   searching an interference state range including the interference state from among a plurality of interference state reference ranges; and
   determining an amount of power reduction that corresponds to a selected interference state reference range and evaluating the control value of the uplink power based on the amount of power reduction.

5. The method of claim 3, wherein the calculating of the interference state further comprises calculating the interference state by multiplying the difference between the amount of interference and the amount of reference interference by the path attenuation difference when the amount of interference is less than the amount of reference interference.

6. The method of claim 5, wherein the evaluating of the control value comprises:
   searching an interference state reference range including the interference state among a plurality of interference state reference ranges; and
   determining an amount of power increment that corresponds to the selected interference state reference range and evaluating the control value of the uplink power based on the amount of power increment.

7. The method of claim 1, wherein the monitoring sector is a neighboring sector that has a minimum path attenuation difference among a plurality of neighboring sectors that correspond to the mobile station.

8. A method for a mobile station to control uplink power based on interference states of neighboring sectors, the method comprising:
   transmitting an index and the path attenuation difference of a monitoring sector to a base station in which the mobile station is included wherein the monitoring sector has a minimum path attenuation difference among the neighboring sectors; and
   receiving a control value of the uplink power from the base station,
   wherein the control value of the uplink power is obtained based on the path attenuation difference of the monitoring sector.

9. The method of claim 8, further comprising:
   respectively receiving a plurality of pilot signals from base stations of the plurality of neighboring sectors; and
   receiving a pilot signal from the base station in which the mobile station is included.

10. The method of claim 9, wherein the obtaining of the plurality of path attenuation differences comprises:
    measuring a plurality of average reception powers and a plurality of average transmission powers by using the plurality of pilot signals; and
    calculating the plurality of path attenuation differences by using the plurality of average reception powers and the plurality of average transmission powers.

* * * * *